US006945458B1

(12) United States Patent
Shah et al.

(10) Patent No.: US 6,945,458 B1
(45) Date of Patent: Sep. 20, 2005

(54) DATA COLLECTION AND MAINTENANCE DATABASE METHOD AND APPARATUS

(75) Inventors: Niren Shah, Palatine, IL (US); Tony S. Chan, Northbrook, IL (US); Raymond W. Lee, Chicago, IL (US); Daniel J. Parenti, Chicago, IL (US)

(73) Assignee: Bowe Bell + Howell Postage Systems Company, Lincolnwood, IL (US)

( * ) Notice: Subject to any disclaimer, the term of this patent is extended or adjusted under 35 U.S.C. 154(b) by 158 days.

(21) Appl. No.: 10/631,042

(22) Filed: Jul. 29, 2003

Related U.S. Application Data

(60) Provisional application No. 60/399,345, filed on Jul. 29, 2002.

(51) Int. Cl.[7] ......................... G06K 15/00; G06F 17/60

(52) U.S. Cl. ....................................... 235/385; 235/383

(58) Field of Search ................................ 235/385, 381, 235/383, 380, 375, 382; 902/27; 709/217, 709/219, 204, 207, 223; 705/5, 1, 35, 10, 705/11, 21

(56) References Cited

U.S. PATENT DOCUMENTS

| | | | | |
|---|---|---|---|---|
| 6,101,537 | A * | 8/2000 | Edelstein et al. | 709/219 |
| 6,119,933 | A * | 9/2000 | Wong et al. | 235/380 |
| 6,253,238 | B1 * | 6/2001 | Lauder et al. | 709/217 |
| 6,607,267 | B2 * | 8/2003 | Testardi et al. | 347/100 |
| 6,671,818 | B1 * | 12/2003 | Mikurak | 714/4 |
| 6,694,307 | B2 * | 2/2004 | Julien | 707/3 |
| 6,836,773 | B2 * | 12/2004 | Tamayo et al. | 707/6 |
| 2004/0143526 | A1 * | 7/2004 | Monasterio et al. | 705/35 |
| 2004/0167794 | A1 * | 8/2004 | Shostack et al. | 705/1 |
| 2004/0249811 | A1 * | 12/2004 | Shostack et al. | 707/5 |
| 2004/0260781 | A1 * | 12/2004 | Shostack et al. | 709/207 |

* cited by examiner

*Primary Examiner*—Thien M. Le
(74) *Attorney, Agent, or Firm*—McDermott Will & Emery LLP

(57) ABSTRACT

An apparatus and method for use in a networked postal computing environment for centralizing collected data and generating post processing reports to facilitate near real-time access of selected data by authorized users, and involving the steps of collecting data from a plurality of networked mail processing apparatus operating in a mail processing environment. The collected data is transmitted to a data collection and processing server, having a web interface application, for storage in an associated database. The data collection and processing server preferably provide secure user access via a user web browser application. A user can then request retrieval of selected data stored in the database to the data collection and processing server. The selected data is then retrieved and one or more interactive web pages with the selected data are generated and presented to the user. The collected data relates to mail job data, mailer data, and operation and performance data for mail verification apparatus.

17 Claims, 5 Drawing Sheets

DATA COLLECTION AND MAINTENANCE DATABASE METHOD AND APPARATUS

CROSS REFERENCE TO RELATED APPLICATIONS

The present application claims the benefit of U.S. Provisional Application Ser. No. 60/399,345 filed Jul. 29, 2002, the disclosure of which is entirely incorporated herein by reference.

TECHNICAL FIELD

The present subject matter relates generally to computerized systems or networks interconnecting automated mail systems that process mail and mail pieces in post offices and mail processing facilities. More particularly, the present subject matter relates to the collection of data and information in mail verification apparatus and systems, the transmission of the collected data to a centralized computer or computerized apparatus, and the manipulation, processing and accessing of the collected data through web pages by authorized users interfacing via web browser applications or programs on user computers or other client devices.

BACKGROUND

Mail sorting, handling, preparation and verification systems are well known and are commonly used in government, private and/or corporate mail handling facilities. Mail processing systems typically employ automated mail processing apparatus controlled and operated by computers or computerized controllers. The computerized controller can be one or more computers with appropriate hardware and software applications configured to execute desired automated mail processing functions. Additionally, computers typically monitor the operation and performance of the mail processing apparatus and collect and store data related to the operation and performance of a mail processing or verification apparatus, the mail pieces being processed in a mail job and the mailer of the mail pieces.

The collected data can be stored in any number of storage mediums interoperable with the computer, for example on the computer's own hard drive storage, auxiliary storage, disk or tape drives, etc. The data can subsequently be viewed on a computer monitor or saved to a floppy disk or CD or DVD type ROM for transport to and viewing on another computer, e.g., a personal computer. Further, the collection and storage of raw data is typically done as a mail job is in process or on a near-real time basis after the mail job is complete.

One well known mail processing apparatus is an automated mail verification device or apparatus. One example of a mail verification apparatus is a Mailing Evaluation, Readability, and Lookup Instrument (MERLIN) machine or device manufactured and sold by Bell & Howell Mail and Messaging Technologies located in Lincolnwood, Ill. A MERLIN verification apparatus is a computerized tool or machine apparatus that is used in a mail processing facility, such as the United States Postal Service (USPS), to verify that a mailer has sorted or presorted mail pieces in the manner claimed by the mailer prior to delivering the sorted mail pieces to the USPS for delivery by the USPS to the intended addressees. The USPS or other receiving postal facility uses the mail verification apparatus devices to verify mailer sorting to thereby make a determination of any discount rate that may be given to the mailer that sorts or pre-sorts its mail pieces in a predetermined or particular manner, e.g., by Zip Code, by city, region, etc. Use of mail verification apparatus or devices also reduce the work required at the postal facility.

Mail verification apparatus can be used in the processing of bulk and non-bulk mail applications. Due to the large number of mail pieces typically involved in many mailings, only a statistically representative sample or number of mail pieces is actually examined by the mail verification apparatus to verify that the mail pieces are pre-sorted in the manner claimed by the mailer for a particular mail job. This is often the case since the number of mail pieces delivered to the postal facility can be in the thousands or hundreds of thousands of mail pieces depending on a particular mailer.

Existing mail verification apparatus, such as the MERLIN machine, typically include a mail piece feeder which can feed about 6000 mail pieces per hour into the verification apparatus, a mail piece thickness detector, a scale which carries out in-line weighing of the mail pieces, a camera system which records images of the mail pieces, an identification (ID) printer which prints a unique ID on each mail piece, and a computer that controls and operates the various components of the mail verification apparatus. The computer also monitors, stores and manipulates data in a particular mail job or run related to the operation and performance of the mail processing apparatus, the processed mail pieces and mailer. An example of a mail verification apparatus or system is described and shown in U.S. Pat. No. 6,311,892 for an Automatic System for Verifying Articles containing Indicia Thereon issued on Nov. 6, 2001 to O'Callaghan, et al., which is incorporated herein by reference.

For a given mail job or mail run processed for a mailer, data and information is typically collected by a mail verification device or machine. The collected data and information generally includes two types of job summary data: maintenance or performance data, and mailer data. Maintenance data can include among other items, apparatus or system events such as number of times mail pieces jam in the apparatus, number of mail piece fly-outs, and system faults such as a malfunctioning thickness detector, weight detector and imaging camera, etc. The apparatus maintenance information may assist operation or maintenance personnel in determining whether a verification apparatus is operating well or whether it is malfunctioning and in need of maintenance or repair. Mailer data can include among other items, mailer ID information, whether mailer pre-sorting was accurate and acceptable to postal standards, amount of any postal discount based on the verification apparatus results, etc.

Upon the completion of a mail job or mail run, the mail verification device computer typically executes programs or applications to conduct analysis on the data and information collected. Reports can then be generated which relate to and provide useful information about a particular mail job or run, the operation and performance of the mail verification apparatus, the mail pieces being processed and mailer information. The post processing reports can also be saved to an associated storage medium, e.g., a computer hard drive or associated disk drive, of the mail verification apparatus. The reports can then be accessed and viewed on a designated computer monitor or saved to a storage disk for viewing on another computer, e.g., a personal computer.

Generated reports can include, among others: a system test report having system test results of a completed mail job or run and which can include Pass/Fail status of certain categories, performance values, number of pieces fed and number of pieces matched with pre-printed PLANET barcodes. The pass/fail categories can include barcode readability test results, address accuracy tests, mail thickness and weight measurement test results, pre-sort analysis tests results, etc. The performance values can include address look-up error rate, meter postage recognition rate, PLANET barcode recognition rate, thickness and weight error rate, total number of mail pieces fed and counted, etc.; another report is a GO NO GO test results report that typically consists of the Pass/Fail results for five weight categories (1, 2, 4, 8 and 12 oz.) and the corresponding Pass/Fail results for thickness test of the mail pieces fed. This report also contains all the measurements for the camera calibration test.

Another generated report is a Post Process Report that summarizes the results for a completed job process and contains the latest run results of the verification apparatus and includes information such as mailer information, how many pieces were verified, what errors were found in this job, permit number of the mail job, mail job start and end time, number of fault for job, number of error types, etc. An End of Day Report can also be generated that includes data elements that display the last end of day summary report and includes the total number of processes aborted, the total number of pieces processed for the day, sum of all duration times When the transport is running a process, the total number of mail block jams detected for the day, the total number of fly-out jams detected for the day, etc.

Another generated report is a System Event report that can be generated that contains information indicating when a verification system maintenance event occurs. A system event can be an error, a warning, or informational. A warning will not stop the verification apparatus mail piece transport. A major system error or fault always stops the transport and demands proper maintenance operation. Unlike the mail jam or fly-out detection, a system fault can occur anytime even when the verification apparatus transport is not running and processing mail. And, a Scale Calibration Results report that generates or displays the latest scale calibration results in the verification system or apparatus, and a Merlin verification apparatus System Configuration report that identifies the verification system configuration and is generated every time after a Go/No-Go test run and a System Test run are completed.

Existing postal or mail processing facilities, such as the USPS, typically have computerized mail verification apparatus, such as the MERLIN machines, located at the various USPS facilities through out the USPS system. The computers for the various mail verification apparatus may be physically spread out nationwide, in certain states, regions, areas or districts and may have a certain organizational structure determined by the postal organization. For example, FIG. 5 shows one organizational layout where one or more mail verification computers may be associated with one or more organizational sites, districts or areas. One drawback is that oftentimes the computers of the various verification apparatus may not be connected or networked together.

This drawback makes it difficult for data and reports generated and stored at individual mail verification apparatus computers at the various postal facility locations to be shared or accessed by users at different postal facilities. Personnel or users at a given postal facility can readily access the data stored in their individual mail verification apparatus and perform analysis or manipulation of the raw data and reports as desired. However, the same personnel are limited if they desire access to data from other mail verification apparatus at other postal facilities due to the lack of interconnection or networking between the mail verification apparatus computers at the various parts of an organization, as shown in FIG. 5. Thus, authorized personnel or users at a particular postal facility needing information or data from another mail verification apparatus at other postal facilities may need to first print or save the needed data to a disk or other storage medium and wait for the information to be delivered. The authorized personnel or user could then view the information and perform any necessary analysis or manipulation of the data received. This approach though feasible can be time consuming, inefficient and expensive. Analysis of data from multiple systems, in real or near-real time, is not possible.

There is thus a need for an improved method and system to centralize storage of raw data and information for one or more mail verification apparatus, to facilitate access, manipulation and retrieval of data and reports for one or more networked mail verification apparatus at a central location, and to enable the generation of post processing reports at a centralized server via a user computer or client device in a cost-effective and efficient manner.

SUMMARY

The present subject matter provides a novel method and system for use in a networked postal computing environment for centralizing and compiling collected data and for generating post processing reports at a centralized computerized server to facilitate the efficient and near real-time access and retrieval of selected data by authorized users, via a web based interface, using client devices at a plurality of mail processing facilities or other locations. The novel subject matter provides a server that receives mail job data, mailer data, and mail verification apparatus operation and performance data collected at a plurality of mail verification apparatus. The server is adapted to retrieve and manipulate collected data, and compile user requested reports from the received collected data. The server can communicate, via a web interface, with a plurality of client user computers or client devices to thereby transmit one or more web pages having user requested data and reports.

In one example, there is provided an apparatus and method for accessing centralized information in a postal environment using a web based interface which involves the steps of collecting data from a plurality of networked mail processing apparatus operating in the mail processing environment and transmitting the collected data to a server, having a web based interface application, for storage in an associated database. The server preferably provides secure access to a plurality of users via a web browser application on a user client device. Once a user has been granted access, a user request for retrieval of selected data stored in the database can be received by server. The selected data can be retrieved and one or more interactive web pages comprising the selected data are generated and presented to the user.

It is an objective to centralize collection and storage of raw data and generate post processing reports at a centralized location for later subsequent access by a plurality of authorized users via a web browser application.

It is another objective to collect maintenance data and information along with mailer data as a background task in a plurality of mail verification apparatus and transfer the collected data to a central database or database server for subsequent report creation, generation, presentation and analysis.

Additional objects, advantages and novel features of the examples will be set forth in part in the description which follows, and in part will become apparent to those of ordinary skill in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. The description may be better understood when read in connection with the accompanying drawings, of which.

DETAILED DESCRIPTION

Figure 1:
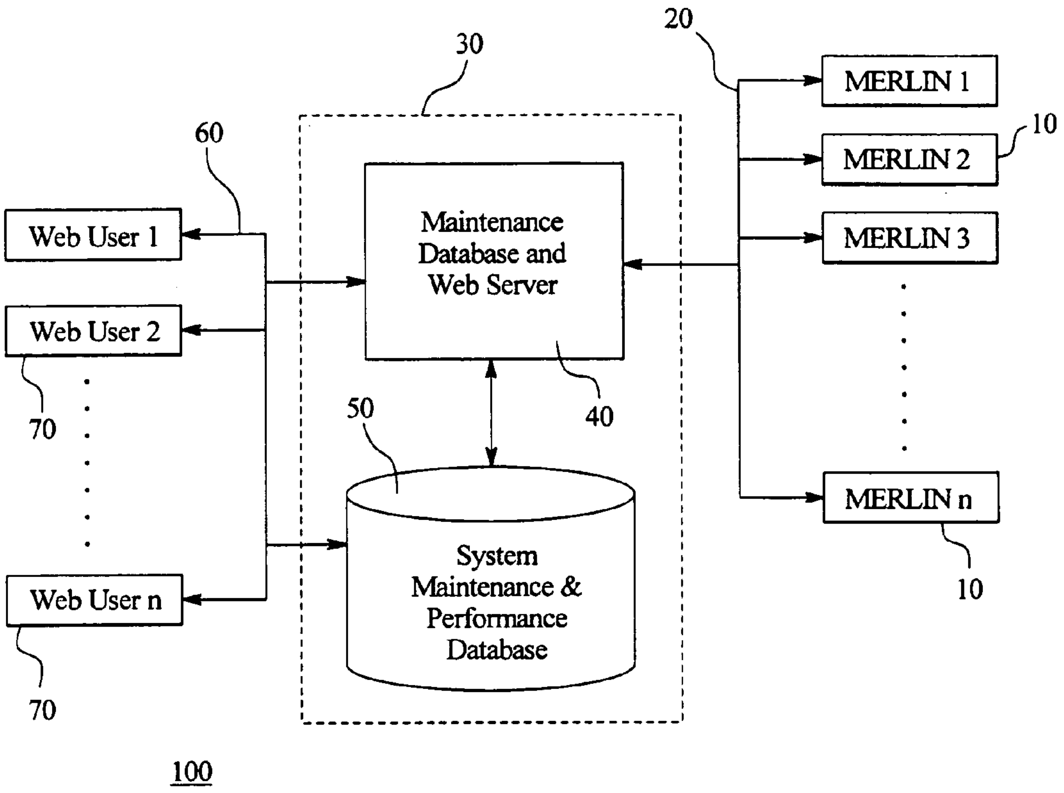
FIG. 1 illustrates a block diagram of a system using a data collection server according to one aspect of the present subject matter.

FIG. 1 shows a block diagram of a data collection system 100 using a centralized data collection and processing server or machine 40 according to one aspect of the present subject matter. The system 100 preferably comprises a plurality individual computerized mail verification apparatus 10, such as a Mailing Evaluation, Readability, and Lookup Instrument (MERLIN) machine or device labeled MERLIN 1, 2, 3 . . . n. First and second network communication links 20 and 60 that enable bi-directionally transmission of data and information. The data collection and processing server 40 may be a maintenance database and web server that interoperates with and is associated with a system maintenance & performance database 50. A plurality of user client devices, including for example Web User 1, 2 . . . n, comprise client devices of appropriate types having communications capability and access rights to use the data in the data collection and processing server 40.

The data collection and processing server or maintenance database and web server 40 and the system maintenance & performance database 50 may be separate components. For example, separate servers or computers as shown in FIG. 1 with appropriate and corresponding applications. Further, those of ordinary skill in the art will readily recognize that the data collection and processing server 40 and the system maintenance & performance database 50 can also be implemented by one or more applications or software modules or programs executed on a single server or computer 30 as depicted in FIG. 1.

The system 100 of FIG. 1 enables users to access collected data and reports generated from the collected data using different types of client computing devices. Disclosed examples include: personal computers or "PCs" (e.g. desktop, laptop, notebook and/or handheld PCs), personal digital assistants (PDAs), wireless mobile telephone devices with sufficient processing power, and the like.

The data collection and processing server 40 can be a stand alone machine or can be an addition to existing mail processor systems since it can be added and integrated with existing mail processing facility servers, computers and associated applications without detrimentally affecting the functioning of existing devices. When integrated into an existing mail processing system 100, the data collection and processing server 40 provides enhanced collection and presentation of mail verification apparatus data to web users 70 in a centralized, efficient and fast manner. The data collection and processing server 40 is an expandable computing machine that permits upgrade and expansion of both hardware and software.

Each mail verification apparatus 10 monitors the operation and performance of the mail processing apparatus and collects and stores data and information related to the operation of the mail processing or verification apparatus, the mail pieces being processed in one or more mail jobs or runs and the mailers. The data is then prepared and collected for transmission, via an associated communication link 20, to the data collection and processing server 40 for processing. In addition to transmitting the data and information, the collected data can be locally stored at the MERLIN mail verification apparatus transmitting the data.

Figure 3:
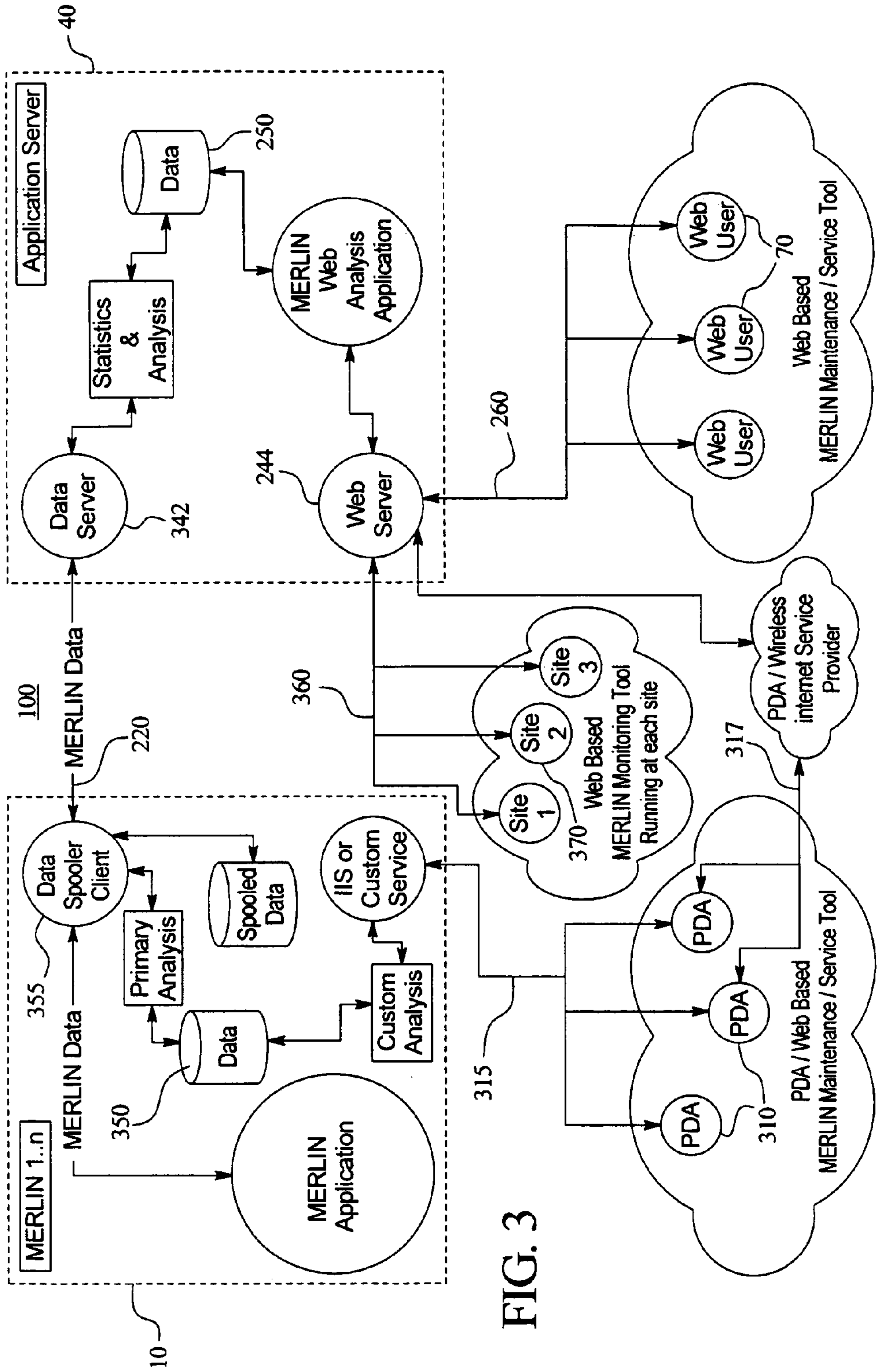
FIG. 3 illustrates another aspect of a system using a data collection server according to the present subject matter.

Locally storing the data at the mail verification apparatus 10 reduces the risk of losing information in a system failure that prevents normal transmission of data from a MERLIN apparatus 10 in the field to the data collection and processing server 40. The copy of the transmitted data can be locally saved for a period of time, e.g., thirty (30) days, until a verification is received from the data collection and processing server 40 that the data was received, or permanently stored. The locally saved data may be saved to a local computer log file or storage 350 at the mail verification apparatus 10, for example as shown in FIG. 3. This aspect further ensures that there is a back up file at each MERLIN or other mail verification machine 10.

The data collection and processing server 40 can receive, among other information: data and summary reports from a plurality of mail verification apparatus 10 at the end of every mail job or run, mail verification equipment summary data at the end of each working day, verification equipment real-time system events, verification or MERLIN system test and Go/No-Go reports.

The collected data received at the data collection and processing server 40 is then processed and parsed into a plurality of record fields. The data and information-is then stored and indexed via the data collection and processing server 40 in the system maintenance and performance database 50. Data and information can subsequently be retrieved by the data collection and processing server 40 from the system maintenance and performance database 50. Those of skill in the art will readily recognize that the storing and indexing may be accomplished through the use of a database management system (DBMS). The DBMS can be running on the data collection and processing server 40 or on a dedicated database server or computers 242, shown in FIG. 2.

The data collection and processing server 40, via a DBMS, and the system maintenance and performance database storage 50 possess features and capabilities that are well known to those of skill in the art. A user can input database queries to access selected data in a desired or defined format. A user can also manipulate data, via the DBMS, to generate desired reports having selected data and information useful to the user. The database and DBMS may be an ORACLE database server, a Microsoft SQL server, an IBM Universal Database (UDB), Microsoft (MS) Access 2000, Corel Paradox, Lotus Approach, or Sybase Database applications, among others known to those of skill in the art.

Once the data and information is stored in the system maintenance and performance database storage 50, it can be securely accessed by one or more users or web users 70 through a web-based user interface application or program residing on the data collection and processing server 40. The user can securely access the data collection and processing server 40 through a web browser application program executing on the user's computer or other user client device 70, for example a hand held personal digital assistant (PDA) 310 using a wireless network, as shown in FIG. 3. Secure access to the data collection and processing server 40 serves to protect the stored data and permit access only to authorized users. Secure access can be provided by computers or client devices and software applications intended for such purpose as is well known to those of skill in the art, e.g., simple password and identification checking programs or utilities that check a user's identification and password against a database file of authorized users and their corresponding passwords.

Figure 5:
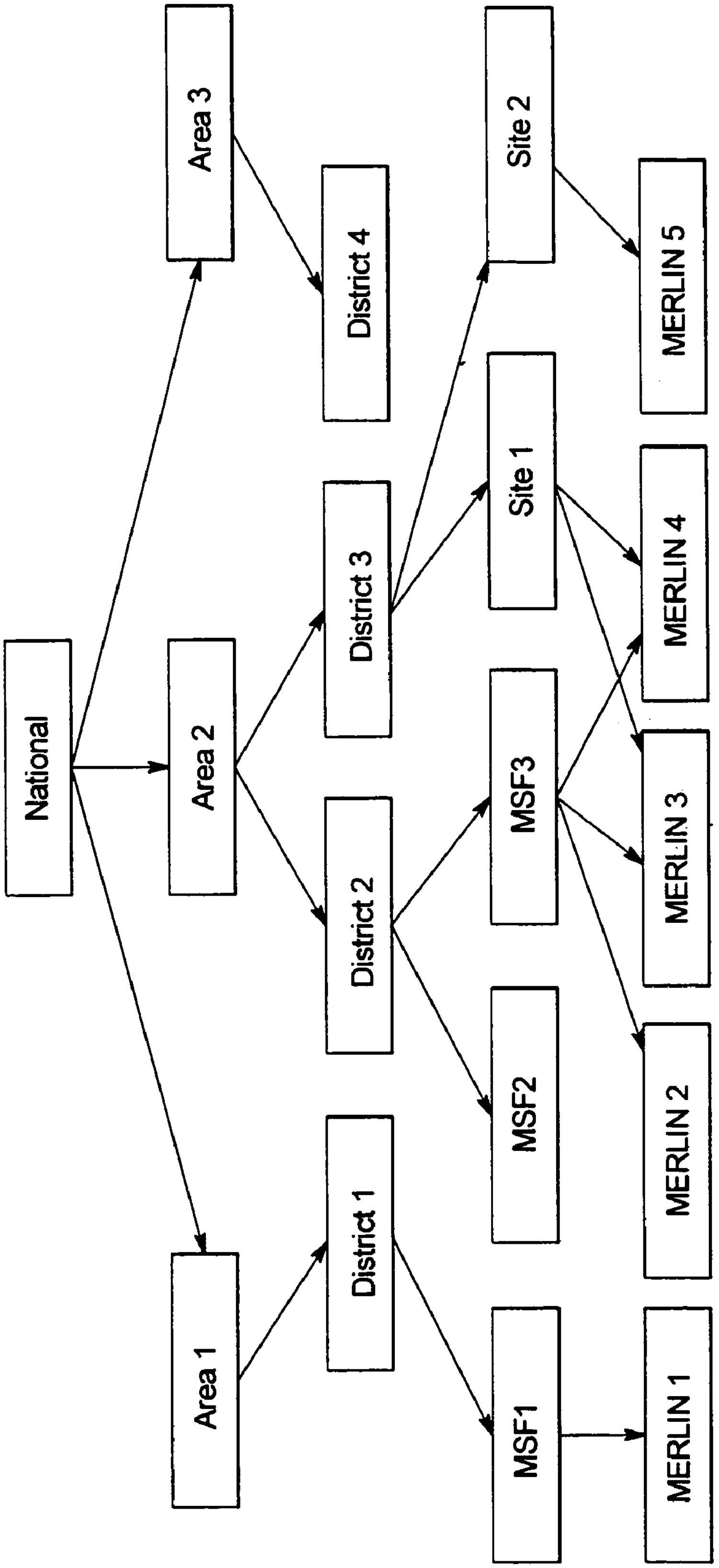
FIG. 5 illustrates an example of an organizational structure of a mail processing organization.

Once a user 70 is properly authenticated, the user 70 can carry out actions on the data collection and processing server 40 that can vary depending on the user 70 or on the organizational structure of an organization, shown in FIG. 5. In one aspect, the data collection and processing server 40 may provide access to information on or below a designated level. For example, a user in District 3, shown in FIG. 5, may have access to data and information for mail verification apparatus 10 associated with Site 1 and Site 2 but not access to data associated with District 1 or District 4 as shown in FIG. 5. Those of skill in the art will readily recognize that the levels of access and organizational interconnections can be modified to fit a particular organization.

Once a user 70 has accessed the data collection and processing server 40, the user 70 can submit queries or requests to retrieve selected data and information or request the generation of reports with the selected data. The user 70 can request data and information related to mail verification apparatus 10 at the same or different level, site, area or location as the user 70 as long as the user is authorized to do so, shown in FIG. 5.

Once the data collection and processing server 40 receives a request or query from a user 70, it will retrieve the requested or selected information from the system maintenance and performance database 50. The selected data can be presented to the user 70 in a standard report format or a user defined format. The data and information will then be transmitted to the web user 70 and presented in one or more interactive output web pages for display on the user's web browser, e.g., on a web-based user-friendly graphical user interface (GUI). The web user 70 can then view, print, save the retrieved selected data or generated report. The user 70 can also continue to interact with the data collection and processing server 40 to obtain additional or different data. Further, FIG. 1 shows that it is also possible for a web user 70 to directly access data from the system maintenance and performance database 50 instead of through the data collection and processing server 40.

The data collection and processing server 40 enables a user to retrieve selected data and information, and generate reports relating to maintenance or performance data of mail processing or verification apparatus 10 and mailer data stored in the system maintenance & performance database 50. The data and information also relates to mail pieces being processed in mail jobs. The data collection and processing server 40 can generate individual job based reports or cross-unit reports. The reports can be made available to a user having a client device or machine 70 with web browser application, e.g., Internet Explorer, or other compatible web based browser application capable of connecting to the data collection and processing server 40 via a network connection.

The data collection and processing server 40 can, in response to a user 70 query or request, generate reports including, among others: a System Test Report, GO NO GO Results report, Post Process Report, End of Day Report, System Event report, remote test & diagnostic system (RTDS) Chat report, RTDS Force Disconnect report, Scale Calibration Results report, mail verification system Configuration, and a Check Alive report. Further, the data collection and processing server 40 preferably present data and reports using static or interactive web-pages, including, among others: Status/Detail Web Pages, Composite/Summary Web Pages, Exception or Regional View Web Pages, Information Web Pages, Data Management Web Pages and a web page related to a MERLIN Summary Post Process Report (Operational Report).

The Status/Detail Web Page can include web pages with content relating to Health of the mail verification system, Up/Down status, Software/Directory Versions on current system, End of Day report, Current System Configuration, Post Process (Operational Report), Go/No-Go data, System Deck data, Scale Calibration data, Chat Events available, Force Disconnect, and System Events on system. The Composite/Summary Web Pages can include web pages with content relating to a mail verification system Health Summary, Up/Down mail verification-system Summary, Software/Directory Exception, End of Day report, Post Process (Operational Report), System Events, and mail verification system Summary Post Process Report (Operational Report).

The web page related to a MERLIN Summary Post Process Report (Operational Report) has a selected data range and comprises mail verification system tests Conducted (<10000 pieces), mail verification system tests conducted (>10000 pieces), Number of Automated Mailings Tested (Letters), Number of Mailings Failed (Letters), Additional Postage Collected (Letters), Number of Automated Mailings Tested (Flats), Number of Mailings Failed (Flats), Additional Postage Collected (Flats), Number of Automated Mailings Tested (Total), Number of Mailings Failed (Total), Additional Postage Collected (Total), Number of Automated Mailings Tested (Presort), Number of Mailings Failed (Presort), Additional Postage Collected (Presort), Total Number of FCM Metered Mailings Accepted (Shortpaid), Number of FCM Metered Mailings Tested (Shortpaid), Number of Mailings w/Shortpaid pieces (Shortpaid), Additional Postage Collected (Shortpaid), Number of Permit Imprint Mailings with Piece Count Changes, Additional Postage Collected (for piece count changes), and Utilization (4 timestamps—input, transport, analysis, reports).

The Exception or Regional View Web Pages can include web pages with content relating to Software Version Exceptions, Directories Exceptions, Misconfigured mail verification system, or MERLIN, Exceptions, Go/No-Failure, and System Deck Failure. The Information Web Pages can include web pages with content relating to a mail verification system Location, Static mail verification system Data, USPS Region Report, and Maintenance Support/Service Facility (MSF) PC Report. The Data Management Web Pages can include web pages with content relating to User Management, User Levels, Maintenance, Operational, administrative/Engineering, mail verification system Location Management, Static mail verification system Data Management, USPS Region Management, and MSF PC Management.

Many of the functions relating to the data processing and distributing of mail verification information are implemented on computers, which are connected for data communication via the components of a network. The hardware of such computer platforms typically is general purpose in nature, albeit with an appropriate network connection for communication via the intranet, the Internet and/or other data networks. Data communication links may be wired or wireless.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. Where operating as a server, the computer system will typically have a relatively high-speed communication interface to the packet-switched data network. A database and/or associated web server application may be implemented as a distributed application, having instances that appear on multiple physical server platforms.

A computer system operating as a client or user device typically comprises a central processor, an internal communication bus, various types of memory, and a data communication interface, although the communication interface may not provide speed as high as that used by the server. Such client devices will also have a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system (server or client) also may be combined with or built into one or more of the mail verification systems.

The software functionalities involve programming, including executable code as well as associated stored data. The software code is executable by a general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable program or application. Execution of such code by a processor of the computer platform enables the platform to implement the database and server functions or the user-client functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platforms or client devices. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 2:
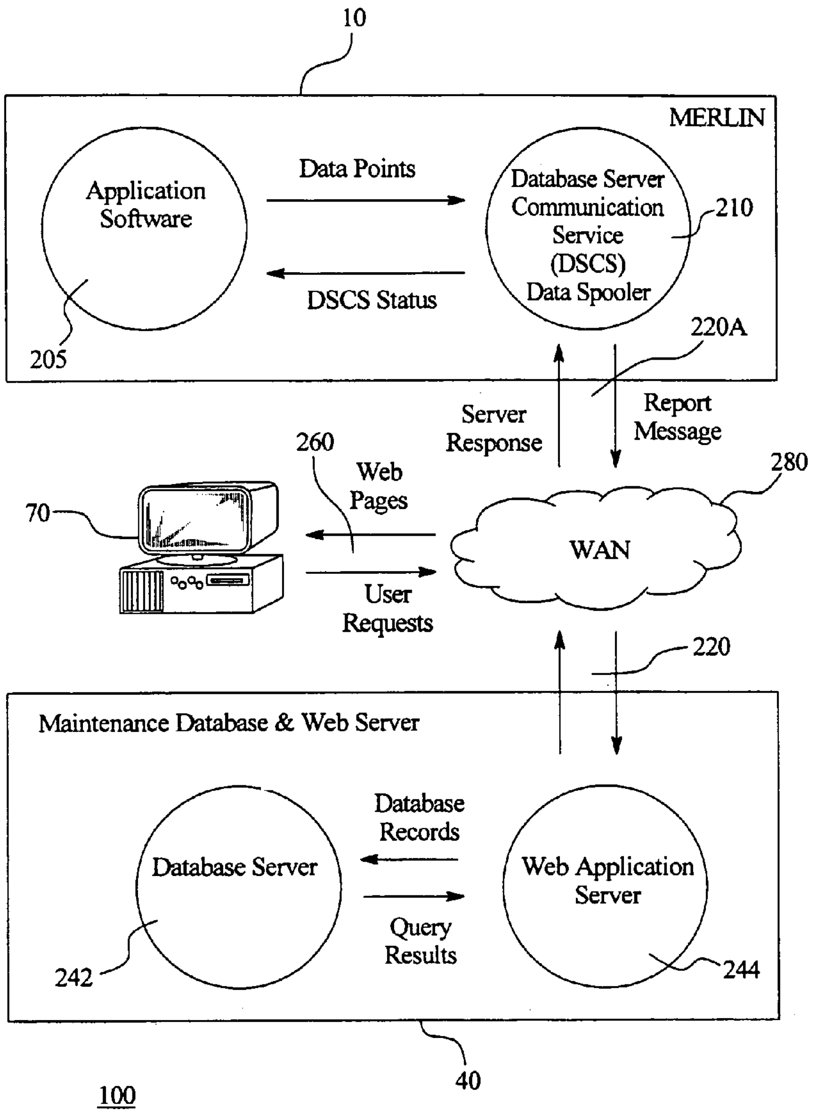
FIG. 2 illustrates an aspect of components used in the system of FIG. 1.

FIG. 2 shows, in greater detail, aspects of the data collection and processing server 40 and the Mailing Evaluation, Readability and Lookup Instrument (MERLIN) computer or MERLIN mail verification apparatus 10 shown in FIG. 1. There is also shown a single web user client device 70, and a data collection and processing server 40. The mail verification apparatus 10, the data collection and processing server 40 and the user client device 70 are connected through a wide area network (WAN) and communicate and exchange data and information through two-way or bi-directional network links 220, 220A and 260.

FIG. 2 shows that the mail verification apparatus 10 comprises an application software 205 communicatively connected to a database server communication service (DSCS) or data spooler 210. The data collection and processing server 40 comprises a database server 242 communicatively connected to a web application server 244. The database server 242 is preferably associated with the system maintenance & performance database 50 as shown in FIG. 1.

FIG. 2 illustrates that the DSCS 210 transmits and received data to and from the web application server 244 via the wide area network 280 and communication links 220 and 220A. The user 70 is able to communicate with the web application server 244 through the wide area network 280 and communication links 220 and 260. The data communications links between the mail verification equipment 10, the data collection and processing server 40, and the web user computer or client device 70 are preferably two-way or bi-directional network communication links 220, 220A and 260. The communications links 220, 220A and 260 connect the various components to a wide area network (WAN) 280. Those of skill in the art will readily recognize that the communications links 220A could instead connect to a local access network (LAN) or other type of network.

FIG. 2 also illustrates the data flow of data that is monitored and collected by the mail verification apparatus computer 10 and transmitted to the data collection and processing server 40, and in particular to the web application sever 244, the database server 242 and the system maintenance & performance database 50. In one aspect shown in FIG. 2, data flow to the data collection and processing server 40 of collected data can involve four components: the MERLIN application software 205, the client data server communication server (DSCS) or data spooler 210, the web application server 244 and the database server 242.

The first component, the MERLIN application software 205, is an application, module or program in the mail verification apparatus 10 that determines which data or information is to be monitored, collected or extracted and transferred to the database server communication service (DSCS) or data spooler 210 for subsequent export or transmission to the data collection and processing server 40, and in particular to the maintenance database server 242.

The second component, the MERLIN verification equipment DSCS client software, program or module 210 is used to format output or transmit collected data and messages to the maintenance database server 242. As discussed previously with reference to FIG. 1, the transmitted collected data to the maintenance database server 242 can be logged or saved at the MERLIN verification apparatus machine 10, until the data collection and processing server 40 confirms the successful transmission and receipt of the collected data sent by the DSCS 210. The database server communication service (DSCS) module or application 210 is implemented as a Windows 2000 service and preferably remains running and always available as long as the database server 242 is up.

The collected data being transmitted can be transmitted as a standard operating access protocol (SOAP)/extensive mark up language (XML) message using file transfer protocol (FTP). However, other suitable and well known formats and protocols may also be used in addition to or instead of FTP. For example hypertext transfer protocol (HTTP), Transmission Control Protocol/Internet protocol (TCP/IP), among others. The data collection and processing server 40 can be a single server associated with a system maintenance & performance database 50 as shown in FIG. 1 or can be comprised of a web application server 244 and database server 242 as shown in FIG. 2.

The third component, the web application server 244 is preferably responsible for parsing collected data received from the DSCS 210 into record fields for subsequent database storage 50 (shown in FIG. 1). In one aspect, the web application server 244 is the application or module that can generate user requested selected data, reports and charts based on the request initiated by a web browser on a user client device 70. The web application server 244 can generate the requested selected data, reports and charts as interactive web pages displayed on the user's client device 70.

The fourth component, the Database Server 242 is the Database Management System (DBMS), such as an Oracle DBMS, that is responsible for storing and indexing all the collected mail verification equipment data that is transmitted by the DSCS or data spooler 210 and parsed by the web application server 244.

In one aspect of operation of a system 100 using the data collection and processing server 40, when the verification equipment or MERLIN 10 finishes a system test, the application software 205 will extract data points and information for the system test and then transfer the collected data points to the DSCS 210. The DSCS or data spooler 210 then appropriately formats the collected data into a report message and sends the data or information to the web application server 244 via the WAN 280. The web application server 244 parses the report message into a number of database records such as operator ID, overall system test result (pass/fail), address accuracy test result, indicia recognition test results, mail dimension test results, etc. for database storage 50 via the database server 242. The database server 242 and associated database storage 50 maintain all records, detail or summary data, for subsequent report generation and presentation, via the web application server 244, as web pages in response to a use requests made via a user client device 70.

Use of the data collection and processing server 40 as shown in FIGS. 1 and 2 enables centralized data access and report generation of mail verification equipment 10 by users 70 with varying levels of authorization or users at various postal facility locations, sites, areas, districts, etc. The data collection and processing server 40 presents interactive web pages and graphical user interfaces (GUI) comprising retrieved collected data from the system maintenance and performance database 50 or database server 242. The data collection and processing server 40 enables consistent remote access to collected data of mail verification computerized machines 10 across an entire network or system 100, e.g., as shown in FIGS. 1 and 5. The data collection and processing server 40 also permits simultaneous multi-user 70 access from one or more web user machines 70 and incorporates various user access and information levels, as shown in FIG. 5, to provide access to selected data and information.

Further, the data collection and processing server 40 enables a user to create reports relating to various levels in an organization such as data relating to mail verification apparatus in one or more state, region, district, site or the whole nation. The generated reports can include, among others: a Job Report that groups the related data from a given job and displays the report in a printable fashion. The report can include all the related fields from one data file or one mail job; a Mailer Report which combines the details from various jobs for a specific mailer. The user can select the mail jobs to include or exclude from this report and gives the user a cumulative view of a mailer and mailer statistics; a verification equipment Software Versions and Directories report that displays the verification equipment software versions and directories for a group of verification equipment; a verification equipment Statistics and Usage report that displays the verification apparatus statistics and usage data, such as minutes used, pieces processed, mail jobs evaluated, etc.; a Trends report that combines past data to generate reports which show the history of a user selected variable. For example, a mailer's performance over the last six months, barcode readability over a particular month, daily mail jobs processed over the last 2 months, etc.

The Data collection and processing server 40 also enables users or system administrators to provide upgrades, including, among others: automatic and automated software updates may be carried out by loading the latest version of a selected software on the Data collection and processing server 40. Each MERLIN or mail verification equipment 10 connected to the central data collection and processing server 40 can recognizing a new update, downloading it and updating itself without explicit user intervention; Automatic Directory Updates. Similar to software updates, the monthly directory updates can also be automated through a delta algorithm capable of reducing the data set to an extent that it can be transmitted over the network within a reasonable amount of time; Automatic Documentation On Computer (DOC) Updates where a CD-ROM with the documents can be made available on central data collection and processing server 40 and can be updated regularly without user intervention; and Switch-On-Demand for verification equipment MERLIN Software Versions. For example, during engineering and QA tests, various versions of software need to be installed on MERLIN 10 and then reverted back to the original at the end of the test. Since the MERLIN 10 would be capable of being updated from the server, more than one versions of the software can be made available and the engineering/maintenance personnel can install any previous version of the software for testing purpose which would greatly reduce the time required to obtain the older CD-ROMs and set these system.

The Data collection and processing server 40 also enables users other aspects, including among others: On-Demand Job Reports where each MERLIN or verification equipment preferably keeps an archive of up to thirty days or jobs. The job data is not easily accessible. The web server application 244 can be enhanced to keep track of which jobs are available on each mail verification equipment or MERLIN 10. Reports for these jobs can then be dynamically obtained and viewed by engineering and other authorized personnel as needed; Data Mining. Since the central server 40 would have all the system maintenance and performance data from each currently running mail verification equipment or MERLIN 10, the central server 40 could also, for example, perform database queries to generate summary reports for each mailer and its corresponding industry segment, among others; Automatic E-Mail Alerts. The web server application 244 can be enhanced to interact with an e-mail server (not shown) to send out alerts and notices to selected personnel as and when required. This would enable each mail verification equipment or MERLIN 10 to report problems, requests or status in a timely fashion without user intervention; All Documentation Online. Various pieces of mail verification equipment or MERLIN 10 documentation can be obtained from the central data collection and processing server 40 with relative ease. For example, repair and replace procedures, user guides, SMOs, animation/video for procedures, etc.; and Mail Image Analysis. Since the central data collection and processing server 40 would have the status of each mail verification equipment or MERLIN 10 currently running, the data collection and processing server 40 could also offer a way for engineering, maintenance and other authorized personnel to analyze images from each MERLIN machine or computer 10 by sending images in quasi-real-time to the data collection and processing server 40 for secondary mail verification analysis. The images could include barcode location, barcode quality analysis, and mail dimension (width and height) among others. The results would then be obtained and displayed to a selected user. This aspect can be extremely useful to check the system for consistency and to verify a mailer's mail in cases of conflict.

FIG. 3 illustrates another aspect of the data collection system 100 shown in FIGS. 1 and 2. The system comprises a mail verification device 10, a data collection and processing server 40 with a web application server 244, a database server 342 associated with database storage 250, a plurality of web user client devices 70, and two-way or bi-directional network links 220 and 260 connecting the mail verification machine or device 10, via the data spooler client 355, to the data server 342 and the web users 70 to the web server 244. As before, these devices may also be connected through a wide area network or local access network. FIG. 3 also shows associated components that allow the mail verification machine or device 10 to locally store and analyze the collected data and generate reports, in addition to transmitting the collected data to the data collection and processing server 40 to ensure that there is a back up file at the MERLIN or mail verification machine 10.

FIG. 3 further illustrates that the data and information and reports stored on the mail verification device 10 can be additionally accessed through the use of personal display assistants (PDAs) 310 through appropriate two-way communication link 315 between the PDAs 310 and the mail verification machine or device 10. Those of skill in the art will recognize that appropriate hardware and software applications can be used so that the PDA 310 and the mail verification device 10 can communicate and exchange data.

Additionally, FIG. 3 illustrates that a user can access collected data and reports from the centralized data collection and processing server 40 via a PDA 310 through a two-way wireless communications link 317 set up through an internet service provide or an appropriate wireless communications link. FIG. 3 further shows that users 370 at various site locations can also access data and reports from the centralized data collection and processing server 40 though an appropriate two-way communications link 360. Similar to web users 70 discussed with respect to FIGS. 1 and 2, the Site users 370 can selectively access stored data in raw form or in summary reports via a computer or client device running a web browser application program.

Figure 4:
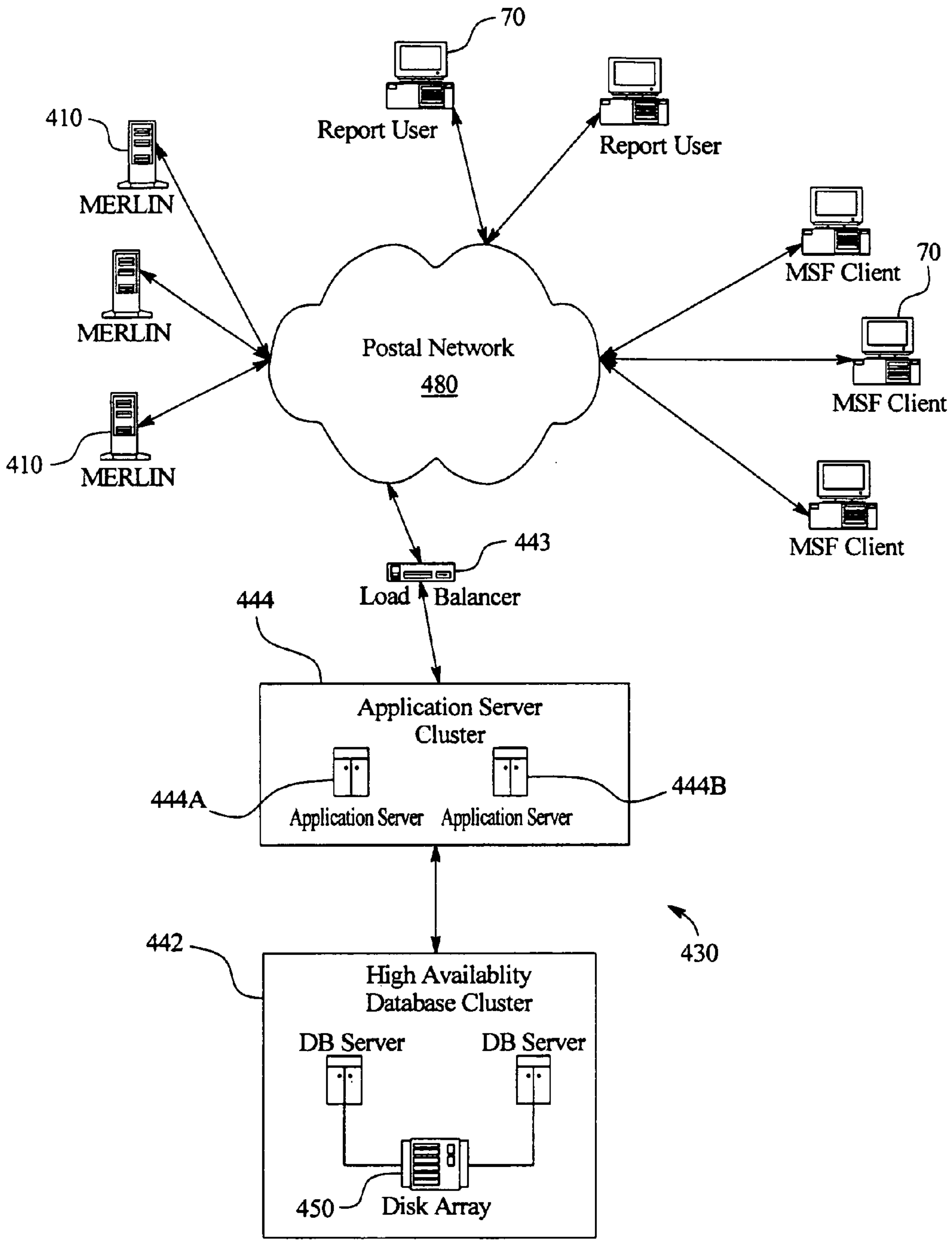
FIG. 4 illustrates one aspect of the system shown in FIGS. 1–3.

FIG. 4 illustrates one configuration or aspect of the system 100 and data collection and processing server 430 that may be used in the networked data collection system 100 shown in FIGS. 1–3. The central Maintenance Database Server 430 can reside on a postal organization network 480, such as the U.S. Postal System (USPS). In one example, the maintenance server 430 resides on the USPS network 480 and receives collected data, including maintenance information from a plurality of MERLIN production systems 410. The maintenance database server 430 can provide web access to maintenance information and other collected data via a plurality of user client computers or devices 70.

In the aspect shown in FIG. 4, the Maintenance Database Server 430 is comprised of four major system components: a Load Balancer 443, an Application Server Cluster 444, a Database Cluster 442, and a Tape Backup System 450. The load balancing hardware 443 can consists of Cisco hardware or other known load balancer hardware. Loading balancing hardware 443 will take the messages coming in from individual MERLINs 410 and route them to whichever application server 444A and 444B in the application server cluster 444 is least loaded. The application server cluster 444 can consists of Sun hardware with a Solaris operating system and BEA WebLogic application server software. The application server cluster 444 can process the incoming MERLIN messages, send updates to the MSF PCs, and process requests for information reports from user 70.

The Database Cluster 442 can consist of Sun hardware with a Solaris operating system and Oracle database software or other known components. The Database Cluster 442 can store the current and historical information for 13 months and distill selected data points into daily counts after thirty (30) days. The Tape Backup System 450 can include Sun hardware or other known components. The tape backup system 450 can provide local maintenance database backup.

The subject matter has been described and illustrated with respect to certain preferred aspects by way of example only. Those skilled in that art will recognize that the preferred examples or aspects may be altered or amended without departing from the inventive spirit and scope of the subject matter. Therefore, the subject matter is not limited to the specific details, representative devices, and illustrated examples in this description. The novel subject matter is limited only by the following claims and equivalents.

We claim:

1. A method of accessing centralized information in a postal environment using a web based interface, the method comprising the steps of:

a) collecting data from a plurality of networked mail processing apparatus operating in the mail processing environment;

b) transmitting the collected data from the plurality of mail processing apparatus to a server having a web based interface application;

c) storing the collected data in a database associated with the server;

d) providing secure access to at least one user to the server via a web browser application on a client device;

e) receiving at least one request from the user at the server for retrieval of selected data stored in the database;

f) retrieving the selected data and generating one or more interactive web pages comprising the selected data; and g) presenting the one or more interactive web pages to the user via the web browser application on the client device.

2. The method of claim 1 further comprising the steps of:

h) storing a copy of the collected data in local storage of a corresponding mail processing apparatus;

i) parsing the collected data into a plurality of record fields; and j) storing and indexing the collected data via a database management system to the database.

3. The method of claim 1 further comprising the step of:

k) deleting the collected data in local storage of the mail processing apparatus after receiving delivery confirmation of the transmitted collected data from the server.

4. The method of claim 1 wherein the mail processing apparatus comprises a data spooler adapted to format and transmits the collected data to the server.

5. The method of claim 1 wherein the collected data comprises mailer related data, mail job data, and data relating to the operation and performance of one or more mail processing apparatus.

6. The method of claim 1 wherein at least one user accesses the maintenance database and web browser using a personal digital assistant.

7. The method of claim 1 wherein the server comprises a web application server and a database server.

8. The method of claim 1 wherein the user accesses the server over a public interconnected network (internet) or an internal network (intranet).

9. A data collection and maintenance database machine for use in a networked mail processing system having a plurality of client devices with associated web browser applications, communication links and a plurality of computerized mail verification apparatus, the data collection and maintenance database machine having computer-executable instructions for causing the machine to perform the steps comprising:

a) receiving collected data from the plurality of mail verification apparatus;

b) parsing the collected data into a plurality of record fields via a web application server;

c) storing and indexing the collected data via a database management system in a database;

d) providing secure access to at least one user via the web application server and web browser application on a client device;

e) receiving at least one request from the user at the web application server for retrieval of selected data stored in the database;

f) retrieving the selected data via a database application and communicating the retrieved selected data to the web application server;

g) generating one or more interactive web pages comprising the selected data at the web application server; and h) presenting the one or more interactive web pages to the user via the web browser application on the client device.

10. The data collection and maintenance database machine of claim 9, wherein the steps performed further comprise transmitting delivery confirmation of the received collected data to the plurality of mail verification apparatus.

11. The data collection and maintenance database machine of claim 9, wherein the steps performed further comprise permitting secure access to a user via a personal digital assistant.

12. The data collection and maintenance database machine of claim 9 wherein the collected data comprises mailer related data, mail job data, and data relating to the operation and performance of one or more mail verification apparatus.

13. A mail processing and data collection system for use in a networked mail processing system having at least one client device with associated web browser application and communication links, the system comprising:

a plurality of computerized mail verification apparatus each comprising, an application software module for collecting mailer data, mail job data, and data relating to the operation and performance of a mail verification apparatus, and a data spooler able to receive the collected data from the application software module and to format the collected data for transmission to a web server;

the web application server adapted:

to parse collected data received from the data spooler, to permit secure access to at least one user via the client device, to generate web pages containing user request data, and to present the web pages to the at least one user via the web browser application on the client device; and a database server adapted to store and index collected data in a database and to retrieve and forward user requested data to the web application server.

14. The mail processing and data collection system of claim 13, further comprising at least one client device adapted to access the web application server using a wireless connection.

15. The mail processing and data collection system of claim 14, wherein the client device is a portable or handheld device.

16. The mail processing and data collection system of claim 13 wherein the user accesses the web application server over a public interconnected network (internet) or an internal network (intranet).

17. The mail processing and data collection system of claim 14 wherein the user accesses the web application server over a public interconnected network (internet) or an internal network (intranet).

* * * * *